Patented Oct. 6, 1931

1,825,812

UNITED STATES PATENT OFFICE

WILHELM NEUMANN, OF WURZBURG, GERMANY, ASSIGNOR TO THE FIRM SCHERING-KAHLBAUM A. G., OF BERLIN, GERMANY

ACYLATED K-STROPHANTHIDINE AND PROCESS OF PRODUCING SAME

No Drawing. Application filed March 21, 1929, Serial No. 348,992, and in Germany April 5, 1928.

My invention refers to pharmaceutical products and more especially to a preparation which is particularly useful as a cardiac remedy.

The k-strophanthine recovered from the seed of strophanthus Kombé or from other drugs, which is used as a cardiac remedy and is a mixture of glycosides, both in its amorphous and its crystallized form, is not altogether reliable as regards its efficiency. On being decomposed with acids it is converted into k-strophanthidine, $C_{23}H_{32}O_6$ two modifications of which are known, one melting at about 173° C., the other at about 232° C. The therapeutical effects of k-strophantidine are in quality similar to those of k-strophanthine, while in quantity they are inferior to it.

Feist (Berichte der Deutschen Chemischen Gesellschaft, vol. 33 (1900), page 2080) did not succeed in obtaining characteristic acylating products of k-strophanthidine. Windaus and Hermanns (Berichte der Deutschen Chemischen Gesellschaft, vol. 48 (1915), page 986) succeeded in producing a benzoyl compound, which being examined by Straub (Biochemische Zeitschrift, vol. 75 (1916), page 143) was shown on being tested on frogs, to possess only one-tenth of the efficiency of k-strophanthidine.

I have now found that very efficient compounds of k-strophanthidine can be obtained, if acylating agents of the aliphatic series, such as halides or anhydrides of the corresponding acids or halo-acids are caused to act on k-strophanthidine, temperatures above room temperature being preferably avoided. I prefer operating in the presence of organic bases belonging to the aromatic and heterocyclic series and having no hydrogen atom combined with the nitrogen atom, for instance pyridines or alkylated anilines. If desired, inert solvents, for instance chloroform, may be used.

The aliphatic acyl or acylhalide compounds of k-strophanthidine, which are thus obtained, possess a greater pharmacological efficiency than k-strophanthidine itself. As compared with k-strophanthine, they offer the advantage of being chemically homogeneous and therefore constant in their properties and action.

Example 1

10 parts k-strophanthidine are dissolved in 100 parts pyridine and to the solution are added at room temperature 100 parts acetic acid anhydride. After 24 hours the acetylation product is precipitated by pouring the solution into ice water and after filtering the deposit is re-crystallized from a 96 per cent alcohol. The new compound

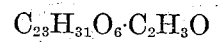

$$C_{23}H_{31}O_6 \cdot C_2H_3O$$

crystallizes in colourless bright prisms which melt at about 248–249° C. The melting point of all substances of this group depends from the duration and speed of heating.

Example 2

4 parts k-strophanthidine are dissolved in 50 parts pyridine and 20 parts propionic acid anhydride are added under cooling. After 24 hours standing at room temperature the solution is poured into 500 parts ice water. The precipitate which gradually settles down, is sucked off after some hours and is crystallized from alcohol. The propionyl-k-strophanthidine $C_{23}H_{31}O_6 \cdot C_3H_5O$ thus obtained crystallizes from alcohol in the form of intergrown colourless bright scales which melt at about 239–240° C.

Example 3

To 200 parts chloroform are added under cooling 10 parts diethyl aniline and 10 parts propionyl chloride. At room temperature 5 parts finely powdered k-strophanthidine are added and the whole is shaken until the strophanthidine has been dissolved. After 2 hours absolute methanol is added to the solution which is then washed after some time, first with dilute hydrochloric acid and thereafter with water. The washing liquors are shaken with some chloroform and the combined chloroform solutions are dried with sodium sulfate and at reduced pressure chloroform and propionic acid methyl ester are distilled off. The residue is taken up with some chloroform and the solution is introduced under stirring into petrol ether, whereupon colourless flakes separate out. The propionyl-k-strophanthidine $$C_{23}H_{31}O_6 \cdot C_3H_5O$$

thus formed is separated by filtration and re-crystallized from alcohol.

*Example 4*

To 100 parts chloroform are added 20 parts α-bromopropionyl bromide and under vigorous cooling a mixture of 10 parts pyridine and 100 parts chloroform. Under continuous cooling 4 parts k-strophanthidine are then added. After 10 minutes absolute methanol is added and after some time the product is separated out in the usual manner. From methanol the α-bromopropionyl-k-strophanthidine $C_{23}H_{31}O_6 \cdot CO \cdot CHBrCH_3$ crystallizes out in colourless bright coarse prisms, which melt at about 192–193° C. under foaming.

*Example 5*

To 200 parts chloroform are added under cooling 5 parts dimethyl aniline and 10 parts isovaleryl chloride, whereupon 5 parts k-strophanthidine are added, the whole being shaken until solution has taken place. After a few hours methanol is added and the whole is further treated as described with reference to Example 3. The isovaleryl-k-strophanthidine $$C_{23}H_{31}O_6 \cdot CO \cdot CH_2 \cdot CH \cdot (CH_3)_2$$

thus formed crystallizes from alcohol in colourless bright oblong scales which melt at about 183–184° C.

*Example 6*

To a solution containing 30 parts α-bromo-iso-valeryl bromide and 15 parts pyridine in 200 parts chloroform are added under cooling 4 parts k-strophanthidine. The mixture is shaken during 15 minutes and methanol is then added. α-bromo-isovaleryl-k-strophanthidine $C_{23}H_{31}O_6 \cdot CO \cdot CHBr \cdot CH \cdot (CH_3)_2$ is separated out in the usual manner. It crystallizes from methanol (50 per cent) in colourless bright needles which melt under foaming at about 203–204° C.

*Example 7*

To a mixture of 200 parts chloroform and 25 parts n-valeryl chloride is added under cooling a mixture of 200 parts chloroform and 25 parts pyridine. 20 parts strophanthidine are now introduced and the liquid shaken to effect solution. After a few hours methanol is added and the n-valeryl-k-strophanthidine $C_{23}H_{31}O_6 CO \cdot (CH_2)_3 CH_3$ separated out in the usual manner. It crystallizes from alcohol in colourless bright scales which melt at about 212° C.

*Example 8*

By replacing the acid chloride described in Example 7 by 30 parts n-capronyl chloride there is obtained n-capronyl-k-strophanthidine $C_{23}H_{31}O_6 \cdot CO \cdot (CH_2)_4 \cdot CH_3$ which crystallizes from alcohol in colourless bright scales melting at about 205–207° C.

*Example 9*

By replacing the acid chloride used according to Example 7 by 30 parts isocapronyl chloride there is formed isocapronyl-k-strophanthidine, $$C_{23}H_{31}O_6 \cdot CO \cdot (CH_2)_2 \cdot CH \cdot (CH_3)_2$$

which crystallizes from alcohol in the form of colourless bright needles, which are combined into bunches. It melts at about 180° C.

*Example 10*

By replacing the acid chloride used in accordance with Example 7 by 30 parts isoamyl acetic acid chloride there is obtained acetyl-k-strophanthidine.

$$C_{23}H_{31}O_6 \cdot CO \cdot (CH_2)_3 \cdot CH \cdot (CH_3)_2$$

which crystallizes from alcohol in colourless bright scales melting at about 195–197° C.

From both modifications of k-strophanthidine are obtained the same acylation products.

The ester of acids having 5–7 carbon atoms have been found to possess the highest pharmacological efficiency.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The process of producing compounds of k-strophanthidine comprising acting on k-strophanthidine with an acylating agent of the aliphatic series.

2. The process of producing compounds of k-strophanthidine comprising acting on k-strophanthidine with an acylating agent of an aliphatic acid having 5–7 carbon atoms.

3. The process of producing compounds of k-strophanthidine comprising acting on k-strophanthidine with a valerylating agent.

4. The process of producing compounds of k-strophanthidine comprising acting on k-strophanthidine with an acylating agent of the aliphatic series while avoiding temperatures above room temperature.

5. The process of producing compounds of k-strophanthidine comprising acting on k-strophanthidine with an acylating agent of the aliphatic series in the presence of an organic base of the aromatic and heterocyclic series and having no hydrogen atom combined with the nitrogen atom.

6. The process of producing compounds of k-strophanthidine comprising acting on k-strophanthidine with an acylating agent of the aliphatic series in the presence of an inert solvent.

7. The process of producing compounds of k-strophanthidine comprising acting on k-strophanthidine with an acylating agent of the aliphatic series in the presence of an organic base of the aromatic and heterocyclic series and having no hydrogen atom combined with the nitrogen atom and an inert solvent.

8. The process of producing compounds k-strophanthidine comprising acting on a solution of k-strophanthidine in chloroform with an acylating agent of the aliphatic series.

9. The process of producing compounds of k-strophanthidine comprising acting on a solution of k-strophanthidine in chloroform with an acylating agent of the aliphatic series in the presence of an organic base of the aromatic and heterocyclic series and having no hydrogen atom combined with the nitrogen atom.

10. The process of producing compounds of k-strophanthidine comprising acting on a solution of k-strophanthidine in chloroform with an acylating agent of the aliphatic series in the presence of pyridine.

11. The process of producing compounds of k-strophanthidine comprising acting on a solution of k-strophanthidine in chloroform with an acylating agent of an alphatic acid having 5-7 carbon atoms.

12. The process of producing compounds of k-strophanthidine comprising acting on a solution of k-strophanthidine in chloroform with a valerylating agent.

13. The process of producing compounds of k-strophanthidine comprising acting on a solution of k-strophanthidine in chloroform with an acylating agent of an aliphatic acid having 5-7 carbon atoms in the presence of an organic base of the aromatic and heterocyclic series and having no hydrogen atom combined with the nitrogen atom.

14. As a new product, an aliphatic acyl derivative of k-strophanthidine being a colourless, chemically homogeneous substance which crystallizes perfectly.

15. As a new product, isovaleryl-k-strophanthidine, crystallizing from alcohol in colourless bright oblong scales which melt at about 183–184° C.

In testimony whereof I affix my signature.

WILHELM NEUMANN.